RE 25257
Jan. 17, 1961        J. T. ELLIS, JR        2,968,284
ELECTROMECHANICAL CONTROL DEVICE
Filed June 10, 1959        2 Sheets—Sheet 1
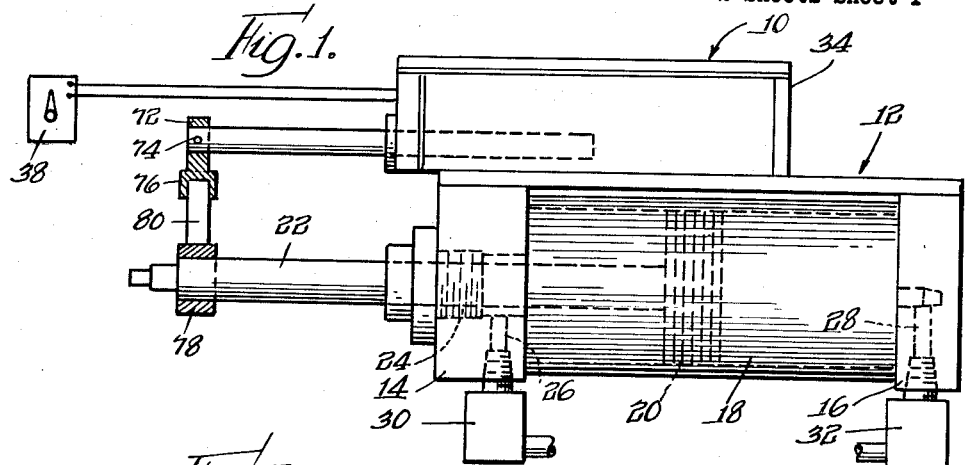
INVENTOR.
John T. Ellis, Jr.
BY
Anthony S. Zummer
atty.

Jan. 17, 1961     J. T. ELLIS, JR     2,968,284
ELECTROMECHANICAL CONTROL DEVICE
Filed June 10, 1959     2 Sheets-Sheet 2
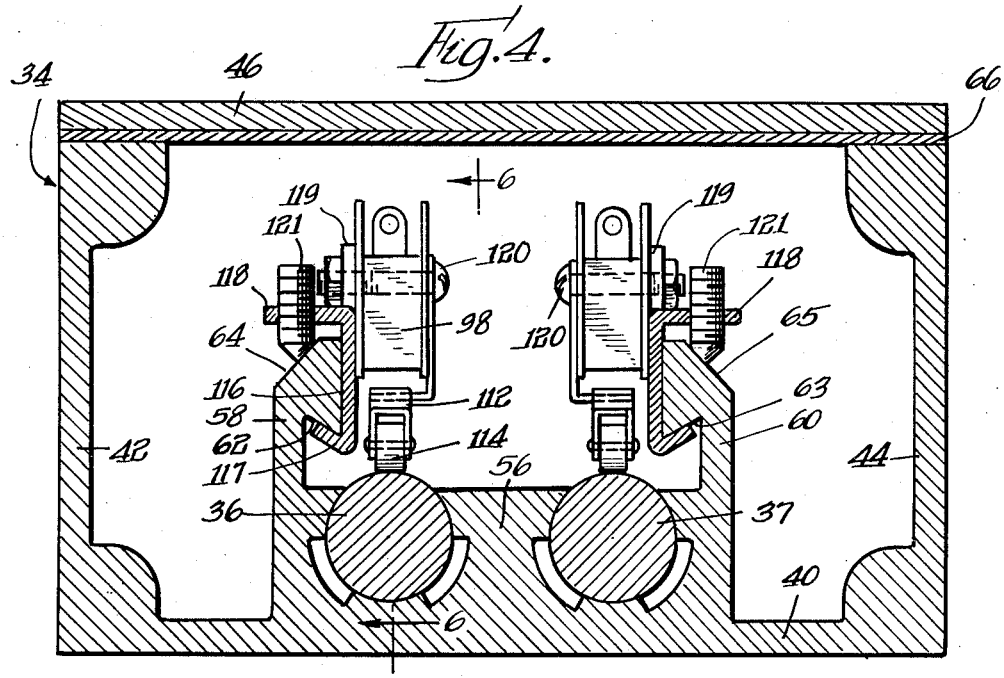
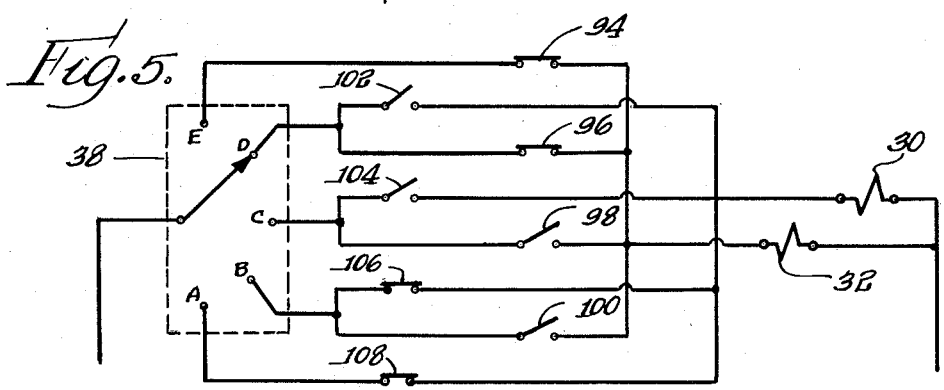
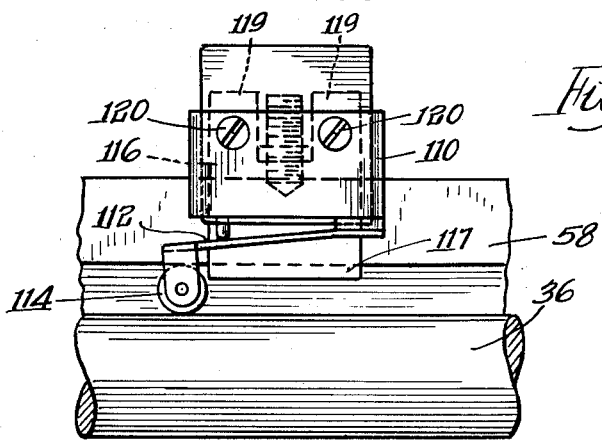
INVENTOR.
John T. Ellis, Jr.
BY
Anthony S. Zummer
Atty

2,968,284

United States Patent Office

Patented Jan. 17, 1961

2,968,284

ELECTROMECHANICAL CONTROL DEVICE

John T. Ellis, Jr., Maine Township, Ill., assignor to Hanna Engineering Works, Chicago, Ill., a corporation of Illinois Filed June 10, 1959, Ser. No. 819,400

12 Claims. (Cl. 121—41)

This invention relates to an improved electromechanical control device and especially to one which is capable of determining the mechanical position of a machine to any one of a plurality of positions or controlling the indication of predetermined positions.

In many industrial applications it is necessary to control from a distant point the position of a mechanical device, such as, a rod of a pneumatic or hydraulic cylinder, a nut on a screw, or any other member relative to a second member. This necessity is particularly acute in the control of valves in chemical processing industries. Various stop limit means and switches have been devised for such applications, but all of these means do not fill all of the needs for all industrial applications. Many of the present devices have only a limited range, or they may operate in only one or two positions. Furthermore, these devices have their preselected positions fixed and cannot be adjusted to compensate for changes in operations or advances in technical procedure. Many of these prior art devices require a large piece of equipment which is not easy to install and is delicate so that it is not able to withstand rugged duty.

Another problem confronting the manufacturer of position control equipment is that the equipment is usually designed for one purpose only or possibly one industry, so that there is added expense in providing various and sundry sizes and types for various applications, thus the cost of each piece of equipment is prohibitively great.

It is one of the objects of the present invention to provide an electromechanical control device which is capable of determining any number of preselected positions, and the positions may be adjusted or changed in the field or in the factory.

It is another object of the herein disclosed invention to provide an electromechanical control device which is compact and rugged.

It is a further object of the instant invention to provide an electromechanical control device which may be used in any one of a large number of applications.

It is a still further object of this invention to provide an electromechanical control device which is capable of controlling positions over a long stroke length.

It is another object of the present invention to provide an electromechanical control device which is enclosed.

Other objects and uses of this invention will become apparent to those skilled in the art upon a study of the following specification in conjunction with the drawings which show:

Figure 1 is a side view of an electromechanical control device embodying the present invention mounted on a pneumatic cylinder;

Figure 2 is a cross sectional view of the electromechanical control device shown in Figure 1;

Figure 3 is a cross sectional view taken on line 3—3 in Figure 2;

Figure 4 is an enlarged cross sectional view taken on line 4—4 in Figure 3;

Figure 5 is an electrical circuit diagram of the device shown in Figure 1; and

Figure 6 is an enlarged side view of an electrical switch taken on line 6—6 in Figure 4.

Referring now to the drawings and specifically to Figure 1, electromechanical control device or controller 10 is shown fixed on a pneumatic cylinder 12 which provides an operating means. The pneumatic cylinder 12 has a conventional construction in that it includes a pair of steel heads 14 and 16 with a tube 18 fixed to them. A piston 20 is slidably mounted in tube 18 and a rod 22 is fixed to the piston and slidably extends through head 14. A gland 24 seals the clearance space between head 14 and rod 22.

The heads 14 and 16 contain air passages 26 and 28, respectively, to allow air to enter the cylinder and apply pressure to the piston. A solenoid valve 30 controls the flow of air into passage 26 thereby regulating the application of pressure to the left side of piston 20, and a solenoid valve 32 controls the flow of air into passage 28 thereby regulating the application of pressure to the right side of piston 20. Air is provided to the solenoid valves 30 and 32, which act as control means for the cylinder, from a convenient source which is not shown.

The controller generally includes a housing 34, a plurality of electrical switches mounted in the housing, which switches are described and identified in detail below, a pair of cams 36 and 37 which is slidably mounted in the housing and engaging the switches, and a selector 38 for electrically connecting the switches with an electric power source, not shown, which selector is mounted at a convenient station.

Looking now to Figures 3 and 4, which show cross sectional views of controller 10, the details of housing or frame 34 may be seen therein. The housing generally includes a floor 40 secured to the cylinder, a pair of side walls 42 and 44 formed integral with the floor, a top or cover 46 secured to the side walls by screws, not shown, and a pair of end walls 48 and 50. The floor has a pair of cam channels 52 and 54 formed in a raised portion 56 between a pair of switch supporting walls 58 and 60. The channels 52 and 54 slidably receive cams 36 and 37 respectively. The cams are supported and guided in the channels to engage the electrical switches as described below. It may be seen that cam channels 52 and 54 are parallel; and walls 58 and 60 are parallel to the adjacent cam channels. Each of the switch supporting walls is identical in construction to the other wall. Bracket recesses 62 and 63 are formed on adjacent sides of the respective walls 58 and 60, and set screw inclinations 64 and 65, respectively, are formed on the sides opposite the respective recesses. The bracket recesses 62 and 63 are adjacent to the respective cam channels 52 and 54. The above-mentioned plurality of switches is mounted on the two walls 58 and 60 as is described hereinafter.

The top or cover 46 closes the top of housing 34. A gasket 66 between the cover and the end and side walls seals the housing and allows the cover to be removed and replaced with an adequate seal. The end wall 48 slidably receives the cams and has a nylon wiper 68 in engagement with each of the cams. The wipers provide a sealing means between the cams and the end wall 48. Both wipers are held in position by a wiper plate 70 which is fixed to end wall 48. It is clear that the wipers and the gasket serve to seal the housing so that the interior of the housing is protected from the atmosphere.

Cams 36 and 37, which are identical, are fixed to the rod 22 by a rod and cam connector. The connector includes a double cam collar 72 which is fixed to the cams by a cam pin 74. A channel guide 76 is fixed to the bottom of the cam collar. A rod collar 78 is fixed to the rod 22 and a stud 80, which is fixed in the rod collar, is received in the channel guide to complete the connection between the cams and the rod.

The above-mentioned plurality of switches includes eight switches mounted in one plane in housing 34. Of the eight switches, four are normally biased open or normally open switches 94, 96, 98, and 100, and the remaining switches are normally biased closed or normally closed switches 102, 104, 106 and 108. As may be seen in Figure 3, the switches are mounted on the walls 58 and 60. The switches are electrically connected as shown in Figure 5 and the wires enter the frame or housing side wall 42 with a sealing gasket at the entrance (not shown) to seal the interior of the frame.

Each of the switches is mounted on its respective wall in the same manner as each of the other switches, so that all the switches are the same distance from their respective cams. Looking now specifically to Figures 4 and 6, which show switch 98 in detail, switch 98 includes a body 110 which has an actuating arm 112 mounted thereon. The actuating arm has a roller 114 mounted on its free end to engage its respective cam, cam 36. The body 110 is mounted on a switch bracket 116.

The switch bracket is a unitary sheet metal member having a hook portion 117 which is adapted for engagement with the bracket recesses. Formed on the other end of the bracket is a mounting tab 118 and a pair of upstanding ears 119. A pair of screws 120 fasten the switch to the ears. The tab 118 has a set screw 121 threadedly mounted therein and the set screw engages the wall 58 to draw the hook portion in tight engagement with the wall to hold the switch in position. Set screw 121 fixes the switch to the retainer 58, but it is evident that the switch may be moved from one position to another by loosening the set screw, sliding the switch to a new position, and then tightening the set screw. Each of the switches mentioned above is mounted on identical brackets 116 and in the same manner on their respective switch supporting walls.

As may be seen in Figure 3, switch 94 is mounted on wall 58 so that its roller is adjacent to end wall 48 and switch 108 is mounted on wall 60 with its roller adjacent to wall 50. Switches 96 and 102, which form a pair of switches in which one of the switches is a normally open and the other switch is a normally closed, are mounted on respective walls 58 and 60 and engage their respective cams. Switches 100 and 106 are also mounted on their respective walls 58 and 60 and engage their respective cams. Switches 98 and 104 are mounted on their respective walls and are operated by cams 36 and 37 as are all of the abovementioned switches.

All of the normally open switches are electrically connected to solenoid valve 30 by conventional wiring, and all of the normally closed switches are connected to solenoid valve 32 by conventional wiring as shown in Figure 5. The plurality of switches is connected to the selector 38, which is a multiposition switch, and the entire circuit is connected to a suitable source of electrical energy not shown. Inasmuch as the circuit diagram for Figure 5 shows the actual position of the various switches for the position of the cams as shown in Figure 3, it may be seen that normally closed switch 104 is open, and normally open switch 98 is also open, since the respective cams end in the space between the two switches. The remaining switches in the circuit have the attitude indicated in the circuit diagram; i.e., normally open switches 94 and 96 are closed, normally open switch 100 is open, normally closed switches 106 and 108 are closed, and normally closed switch 102 is open.

As may be seen in Figure 5, the electrical switches are selectively connected to a source of electrical power through the operation of selector 38 which is a five position switch. When the selector 38 is adjusted to activate station A, then switch 108 is connected to a source of electrical power. At station B, switches 100 and 106 are connected; station C provides for the connection of switches 98 and 104; switches 96 and 102 are connected through station D; and switch 94 is connected to the source of power through station E. Thus, an operator need only operate the selector to connect a selected switch or switches with the source of power.

The controller determines the position of rod 22 in any one of five selected positions. As was pointed out above, the circuit diagram shows the condition of the switches for the position of the cams as shown in Figure 3. When selector 38 has its indicator positioned at station D, two switches are energized, i.e. switches 102 and 96. Because the respective cams are in engagement with both of those switches, normally open switch 96 is closed and normally closed switch 102 is open so that solenoid 32 is energized to allow air to enter the cylinder through passage 28. Thus pressure is applied to the right side of piston 20 thereby forcing piston 20 to the left. As piston 20 moves to the left it carries with it rod 22 and cams 36 and 37, so that, as cam 36 passes switch 96, normally open switch 96 opens to de-energize solenoid valves 32. The pressure is relieved from piston 20 and the piston stops its movement. Should any other of the positions be desired, the selector need only be adjusted so that the proper switches are energized and the piston will be moved to the appropriate position in the manner described above.

From the foregoing description, it may be seen that each of the switches in a pair is operated by a separate cam. This particular arrangement allows the control of position to be determined by the controller to be extremely accurate. Each switch in a pair is positioned independently of the other switch so that the relative distance between actuating positions of the switches may be as small as one-thousandth (0.001) of an inch. It is apparent that the length of each of the cams need not be identical to the length of the other cam since each switch is operated by its respective cam.

Although only five preselected positions are shown in the instant device, more positions may be added by adding additional switches. Should it be desirable to have very small increments between positions, additional cams may be added with additional switches so that there will be a great number of preselected positions. The controller is compact and versatile so that it lends itself to many more applications than that disclosed herein. The length of the stroke controlled by the controller is not limited in any manner.

From the above description, it is evident that the controller is economical to manufacture and produce. The housing is made from extruded metal parts. For instance, the floor, side walls, cam support and walls, are a single piece of extruded metal. The top is a sheet of material cut to size. The switches are standard parts, the brackets for the switches are simply pieces of sheet metal appropriately bent, and set screws secure the switches in place. Each of the cams is a single rod, and the end walls are simply rectangular members with holes to receive the cams. Thus, the electrical position controller is a simple device which is economical to produce. The electrical parts are not complex and the wiring is quite simple.

Although a specific embodiment of the present invention was shown in detail it will be obvious to those skilled in the art that many variations, modifications and changes may be made without departing from the spirit and scope of the present invention. For instance, a hydraulic cylinder may be used with the present invention as well as a pneumatic cylinder. Or, the controller may be used as an indicator rather than for controlling the position of a member. It is expressly understood that the present invention is limited only by the appended claims.

What is claimed is:

1. In an operating device having a cylinder with a rod movably mounted in said cylinder and a pair of solenoid valves regulating the flow of operating fluid into said cylinder, the improvement comprising: a position control device having a frame mounted on the cylinder, a pair of cams reciprocally mounted in the frame, said cams connected to each other and the rod, each of said cams having an actuating portion, a plurality of electrical switches mounted on said frame in engagement with the respective cams, a plurality of said switches being normally biased opened, the remainder of said switches being normally biased closed switches, said switches being mounted on the frame in pairs, each pair including a normally biased open and a normally biased closed switch, a plurality of said switches being positioned for actuation by the actuating portion of one of said cams, the remainder of the switches being positioned for actuation by the actuating portion of the other of said cams, all of the normally open switches being capable of being electrically connected to one of the solenoid valves, all of the normally closed switches being capable of being electrically connected to the other of said solenoid valves, and a selector for connecting a selected pair of switches with their respective solenoid valves, whereby the rod is moved in the cylinder to respond to the position of the cams.

2. A position control device for use with a cylinder having a rod and a pair of solenoid valves connected to the cylinder, one of the solenoid valves controlling the flow of an operating fluid into the cylinder to control the movement of the rod in one direction, and the other solenoid valve controlling the flow of an operating fluid into the cylinder to control the movement of the rod in the other direction, said position control device including a frame mounted on said cylinder, a cam movably mounted in said frame, a plurality of pairs of normally open electrical switches and normally closed electrical switches mounted on the frame for actuation by the cam, said cam connected to the rod in said cylinder, and a selector for connecting one of the switches in a pair with one of the solenoid valves and the other of the switches in the pair to the other solenoid valve.

3. A position controller having a frame, a cam rectilinearly movable in said frame, said cam having an actuating portion, said actuating portion terminating abruptly, a pair of electrical switches mounted on said frame, one of said switches being biased normally open, the other of said switches being biased normally closed, each of said switches having an actuating member for engagement with the actuating portion of the cam to operate the respective switches, said actuating members having a short distance therebetween, and means for connecting the switches to an operating control means for controlling the movement of the cam, whereby the operating control means controls the movement of the cam to a position until the end of the actuating portion of the cam is positioned between the actuating members of the switches which are in operation.

4. A control device including a frame, a pair of connected cams movably mounted on said frame, each of said cams having an actuating portion, a plurality of normally open and normally closed switches mounted on said frame, said switches mounted on the frame in pairs, each of said pairs including a normally open switch and a normally closed switch, one of said cams engageable with a plurality of the switches, the other of said cams engageable with the remainder of said switches, each of said pairs of switches being positioned on the frame to have the actuating portion of one of the cams operatively engage its respective switch while the other switch of the pair is unaffected by the actuating portion of its respective cam, and a selector for connecting a selected pair of switches with operating means.

5. A control device comprising a frame, a plurality of cams reciprocally mounted on said frame, each of said cams having an actuating portion, means connecting said cams to each other in a unit, a plurality of electrical switches moveably mounted on the frame in operative engagement with the respective cams, a number of said switches being normally biased open switches and the remainder of said switches being normally biased closed switches, each cam being operatively engageable with one of the normally biased open switches being operatively engageable with only normally biased open switches, each cam being operatively engageable with one of the normally biased closed switches being operatively engageable with only normally biased closed switches, said frame including means for mounting all of said switches the same relative distance from their respective cams, said switches mounted in pairs of a normally biased open and a normally biased closed switch, each of said pairs of switches being positioned on the frame to have the actuating portion of one of the cams operatively engage one of the switches while the other switch is unaffected by the actuating portion of its respective cam, and a selector for selectively connecting a pair of switches with an electric power source.

6. A position control device having a frame, a plurality of pairs of electrical switches mounted on said frame, each of said pairs including a normally open and normally closed switch, each of said switches having an actuating member, each pair of normally open and normally closed switches having a space between the actuating members of the respective switches, a cam movably mounted in said frame, said cam having an actuating portion operatively engageable with the actuating members for operating the respective switches, said actuating portion of the cam having one end positionable between actuating members of a pair of electrical switches to operatively engage one of the actuating members while the actuating member of the other switch of the pair is unaffected, and a selector for connecting a selective pair of switches with an operating means.

7. A position control device for use with a cylinder having a rod and a pair of solenoid valves connected to the cylinder, one of the solenoid valves controlling the flow of an operating fluid into the cylinder to control the movement of the rod in one direction, the other solenoid valve controlling the flow of operating fluid into the cylinder to control the movement of the rod in the other direction, the control device including a frame, a plurality of electrical switches mounted on said frame, one half the number of said switches being biased open switches and the other half being biased closed switches, said switches mounted on the frame in pairs with a normally open switch and a normally closed switch in each pair, a pair of cams movably mounted on said frame, said cams operatively engaging each pair of switches, said cams secured to the rod to move with said rod, and a selector selectively connecting a pair of switches with the solenoids, whereby the switches control the operations of the solenoids to position a selected cam relative to a selected pair of switches.

8. A control device having a frame, a plurality of pairs of switches mounted on the frame, each pair of switches including a normally open and normally closed switch, each of said switches having an actuating member, each pair of normally open and normally closed switches having a relative small space between the actuating members of the respective switches, a pair of cams movably mounted on said frame, one of said cams engageable with the actuating members of a plurality of normally open switches and the other of said cams engageable with the actuating members of a plurality of normally closed switches for operating the respective switches, each pair of switches being positioned on said frame to have one of the switches operatively engageable with its respective cam while the other switch is unaffected by its respective cam, and a selector selectively electrically energizing one pair of switches at a time.

9. A position control device having a frame, a plurality of pairs of normally open and normally closed switches mounted on said frame, each of said switches having an actuating member, each pair of normally open and normally closed switches having a space between the actuating members of the respective switches, a cam movably mounted in said frame, said cam engageable with the actuating members for operating the respective switches, each of said pairs of switches being positioned on said frame to have the actuating member of one of the switches in a pair in operative engagement with the cam while the other switch of the pair is unaffected by the cam, and a selector for connecting a selected pair of switches with an operating means.

10. A position control device comprising a frame, a plurality of normally biased open electrical switches mounted on said frame, a cam movably mounted on said frame and in operable engagement with said switches, a plurality of normally biased closed electrical switches mounted on said frame, a second cam movably mounted on said frame and in operable engagement with the normally biased closed electrical switches, means connecting said cams to move in unison, said switches being mounted on the frame in pairs with a normally biased open switch and a normally biased closed switch being in each pair, each of said pairs of switches being positioned on said frame to have one of the cams operatively engage one of the switches of the pair and the other switch of the pair being unaffected by its respective cam, and a selector for electrically connecting selectively a pair of switches with an electrical source.

11. The position control device specified in claim 9 in which the frame has a pair of side walls integral with a floor, a pair of end walls sealing the ends of the side walls and floor, said cams slidably mounted in one of said end walls, gasket means between the cams and the respective end wall, and a top sealingly mounted on the side walls and the end walls, whereby the interior of the frame is sealed from the atmosphere.

12. A position control device having a frame, a pair of cams in one plane reciprocally moveably mounted on said frame, each of said cams having a sharply terminating actuating portion, means connecting said cams to each other for movement of said cams in unison in the plane of said cams, a normally biased open switch operatively engageable with the actuating portion of one of said cams, a normally biased closed switch operatively engageable with the actuating portion of the other of said cams, and means for connecting electrically said switches to an electrical power source, said switches being mounted on the frame and being positioned relative to each other and their respective cams to have the normally biased closed switch open and the normally biased open switch open when the cams are in one position with one of the cams having its actuating portion in engagement with one of the switches.

References Cited in the file of this patent
UNITED STATES PATENTS

| | | |
|---|---|---|
| 561,271 | Ongley | June 2, 1896 |
| 2,331,108 | De Ganahl | Oct. 5, 1943 |
| 2,625,661 | Haydon | Jan. 13, 1953 |
| 2,821,172 | Randall | Jan. 28, 1958 |

UNITED STATES PATENT OFFICE
CERTIFICATION OF CORRECTION

Patent No. 2,968,284 January 17, 1961

John T. Ellis, Jr.

It is hereby certified that error appears in the above numbered patent requiring correction and that the said Letters Patent should read as corrected below.

Column 7, line 32, for the claim reference numeral "9" read -- 10 --.

Signed and sealed this 13th day of June 1961.

(SEAL)
Attest:

ERNEST W. SWIDER
Attesting Officer

DAVID L. LADD
Commissioner of Patents